United States Patent [19]

Moore, Sr.

[11] Patent Number: 5,078,391

[45] Date of Patent: Jan. 7, 1992

[54] EXERCISING BICYCLE HANDLEBAR ARRANGEMENT AND BICYCLE EQUIPPED THEREWITH

[76] Inventor: David W. Moore, Sr., 1381 Stephens Rd., Virginia Beach, Va. 23454

[21] Appl. No.: 497,202

[22] Filed: Mar. 22, 1990

[51] Int. Cl.$^5$ .......................................... A63B 21/00
[52] U.S. Cl. ...................................... 272/73; 272/130
[58] Field of Search ........................... 272/73, 130, 72; 280/230, 289 H, 290; 74/551.8, 551.1

[56] References Cited

U.S. PATENT DOCUMENTS

| | | |
|---|---|---|
| 1,503,832 | 8/1924 | Hubbard . |
| 1,507,554 | 9/1924 | Cooper ................................. 272/73 |
| 4,147,370 | 4/1979 | Lindsey, Jr. . |
| 4,602,781 | 7/1986 | La Marsh et al. .................... 272/73 |
| 4,616,840 | 10/1986 | Green . |
| 4,733,880 | 3/1988 | Wilhelm ............................... 272/73 |
| 4,773,662 | 9/1988 | Phillips . |
| 4,838,544 | 6/1989 | Sasakawa et al. . |
| 4,844,451 | 7/1989 | Bersonnet et al. . |
| 4,850,587 | 7/1989 | Lin . |

Primary Examiner—Stephen R. Crow
Attorney, Agent, or Firm—Sixbey, Friedman, Leedom & Ferguson

[57] ABSTRACT

An exercising bicycle handlebar arrangement for retrofit installation on a bicycle frame includes a handlebar assembly having a pair of handgrips, a pivot assembly for pivotally connecting the handlebar assembly to a handlebar mounting stem of a bicycle frame, and shock absorber type struts for controlling the force required to displace the handlebar assembly in a forward-and-back oscillation about the pivot assembly, the struts being pivotally connected to the handlebar assembly and an upper end portion and to a front wheel axle in a free rolling manner at a lower end portion. In an installed condition on a bicycle, the handlebar assembly can be turned freely about a generally vertical axis and can be swung forward and back against a preset resistance about a generally horizontal axis during riding of the bicycle without affecting free rotation of the front wheel of the bicycle. The amount of resistance required to displace the handlebar assembly is selectively adjustable and the ability for the handlebar assembly to oscillate in a forward-and-back motion can be selectively locked out. Furthermore, an adjustable restraining strap is provided for preventing unrestricted forward movement of the body of a rider during forward displacement of the handlebar assembly when it is freed for forward-and-back oscillation.

14 Claims, 7 Drawing Sheets

EXERCISING BICYCLE HANDLEBAR ARRANGEMENT AND BICYCLE EQUIPPED THEREWITH

BACKGROUND OF THE INVENTION

1. Field of the Invention

The present invention relates to bicycles, and in particular to a bicycle which will provide exercise to the arms and upper body of the rider, and a handlebar arrangement that is adaptable to existing bicycles to achieve this result.

2. Description of Related Art

It has long been recognized that a bicycle, while an excellent form of exercise, mainly provides good exercise for developing the muscular strength of the legs and for building up cardiovascular endurance, while making little or no use of the arms and upper body.

Thus, in the development of stationary exercise bicycles, an important area of focus has been on providing a more general body workout, including exercise of the abdomen, back, and arms, as well as increasing the amount of aerobic exercise provided, through the provision of movable handlebar assemblies which, for the most part, supplement the exercise provided by pedaling with a rowing type of arm exerciser. Three recent examples of such exercise bicycles can be found in U.S. Pat. Nos. 4,838,544; 4,844,451; and 4,850,587.

In the case of bicycles that are designed to be ridden for transportation and/or recreational purposes, the fact that a rider's arms are utilized mainly for stability and steering purposes has been viewed primarily as a waste of a source of extra propulsion for the bicycle, and only secondarily, if at all, from the standpoint of providing exercise to the arms and upper body. Hubbard U.S. Pat. No. 1,503,832; Lindsey, Jr. U.S. Pat. No. 4,147,370; Green U.S. Pat. No. 4,616,840; and Phillips U.S. Pat. No. 4,773,662 are representative of bicycles which have been developed and which utilize both the arms and legs for propulsion purposes.

Of these bicycle patents, only the Lindsey, Jr. and Phillips patents have been designed with a thought to use on existing, conventional bicycle frames with little or no modification thereto. In both cases the handlebar assembly of a conventional bicycle is replaced with a sprocket chain arrangement, the chain being coupled to a gearing on the front wheel (which must be provided with a hub of the type previously associated only with bicycle rear wheels).

In the case of the Lindsey, Jr. patent, the handlebar arrangement is designed to allow the handlebars to be pivotally moved forward and rearwardly in a rowing type of movement for driving a crank actuated front sprocket that is carried by struts of the assembly and which drives the sprocket chain. On the other hand, in the Phillips patent, the handlebar assembly is formed by handles provided on crank arms that are connected to the sprocket gear of the handlebar drive assembly, itself.

The Green and Hubbard patents disclose arrangements wherein a rowing motion of a handlebar assembly is transmitted to the rear wheels of the cycle. However, the arrangement of the Green bicycle is complicated and appears inherently unstable from both a structural and riding standpoint, except, perhaps, When utilized as a stationary exercise machine. In contrast, the Hubbard tricycle is a crude arrangement which requires the arms to be utilized as a primary source of power, thereby eliminating the possibility of riding without use of the arms, which is important since the arms of a rider are likely to often fatigue before the rider's legs.

Furthermore, in the case of all of the noted bicycles wherein the handlebar assembly is utilized for motive purposes, the degree of exercise provided to the arms and from them to the upper body is inherently linked to the effort being exerted by the rider's legs, the speed of travel of the cycle, and the terrain (uphill, downhill or flat) over which the bicycle is travelling. Also, because of the need to transfer motive force between the handlebar assembly and the wheel it is driving, such arrangements must be more complex and costly than is possible for one designed solely to provide upper body exercise.

Thus, there is still a need for an arrangement by which a conventional bicycle can be easily and economically adapted to provide exercise to the arms and upper body of the rider, at the rider's option and independent of any factors that are linked to propulsion of the bicycle.

SUMMARY OF THE INVENTION

In view of the foregoing shortcomings of the prior art, it is a primary object of the present invention to provide a means by which a bicycle of the type used for transportation or recreational purposes can provide exercise for the arms and upper body without linking the obtaining of such exercise to propulsion of the bicycle.

It is a further aspect of the present invention to provide a bicycle with a capability to provide exercise for the arms and upper body and which is designed so that the exercise feature may be disabled for use of the bicycle in a conventional manner.

Another object of the present invention is to enable a bicycle having the above attributes to be achieved through an exercising bicycle handlebar arrangement which requires no modifications to the design of a conventional bicycle and, thus, can be retrofit installed in place of the handlebar of an otherwise conventional bicycle in a simple and economical manner.

A still further object of the invention is to achieve the foregoing characteristics without sacrificing rider safety or the rider's ability to apply an effective cranking force to the pedals for propulsion.

These and other objects of the present invention are achieved via preferred embodiments of the present invention wherein handlebars for a bicycle are mounted to a frame which is able to pivot to-and-fro in a rowing motion upon a stem that is received in the steering post housing of a bicycle frame in the same manner as a conventional handlebar. In order to provide resistance for exercise purposes, shock absorber type piston and cylinder units are connected as struts running between a handlebar assembly frame and the axle of the front wheel, so that the rowing motion of the handlebars must be performed against the controllable resistance of the struts.

Inasmuch as bicycle riders customarily exert a large force upon the handlebars while pedaling, in order to increase the cranking force imparted by their legs and feet via the resistance offered by the handlebars, in accordance with a further feature of the present invention a belt, much like a lap seat belt in an automobile, is provided. This belt has the capacity to restrain forward movement of the body of the rider, thereby providing some means for offering the resistance afforded by the handlebars in a conventional bicycle and, at the same time, securely and safely holding the rider so as to prevent any tendency that might, otherwise, exist for the rider to fall forwardly off of the seat when the handlebar is swung forwardly.

These and other objects, features and advantages of the present invention will become more apparent from the following detailed description when viewed in conjunction with the accompanying drawings.

DETAILED DESCRIPTION OF THE PREFERRED EMBODIMENTS

Referring to FIGS. 1-6, a preferred embodiment exercising bicycle handlebar arrangement for retrofit installation on a bicycle frame, designated generally by the reference numeral 1, is shown installed upon a frame F of a bicycle B. Handlebar arrangement 1 is comprised of a pivotable handlebar assembly 3 and a resistance means 5 for controlling the force required to displace the handlebar assembly 3.

Handlebar assembly 3 is comprised of a handlebar 7 that is fixed atop a frame-like housing 9. Frame-like housing 9 carries a pivot means 11 by which the handlebar assembly is pivotally connected to a handlebar mounting stem 13 of the bicycle frame F. Frame-like housing 9 also carries a pivotal connection subassembly 15, by which the resistance means 5 is pivotally connected to the handlebar assembly 3 at an upper end portion of the resistance means, in a manner described in greater detail below.

The frame-like housing 9 is composed of a rear pair of tubes 9a, 9b and a front pair of tubes 9c, 9d that are welded to the handlebar 7 so that the tubes of each pair are angled toward each other but away from the tubes of the other pair. A lower end portion of the rear tubes 9a, 9b are connected together by a reinforcing tube 9e and carry a pair of rear mounting plates 17a, 17b which extend downwardly from their lower ends in a parallel facing relationship with respect to each other.

Each of the rear mounting plates 17a, 17b have three handlebar length setting holes 18. In a similar fashion, the lower end portion of the front tubes 9c, 9d are also interconnected, but in this case such is done by a bracket-like front mounting plate 19 which is provided with three mounting holes 20. Mounting holes are matched in height to the setting holes 18 of the rear mounting plates 17a, 17b.

Figure 5:
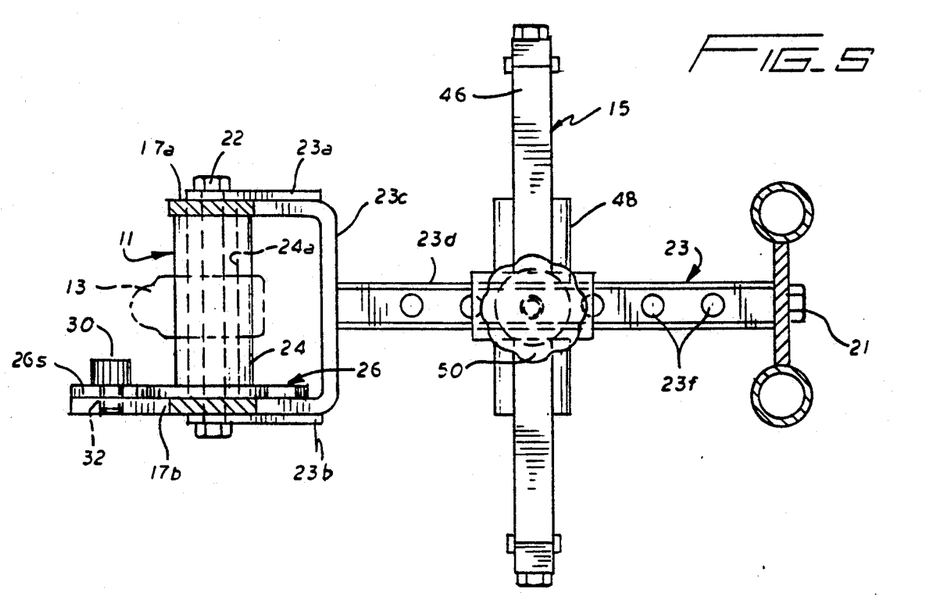
FIG. 5 is a sectional view taken along line 5—5 of FIG. 3, and which shows an adjustment yoke of the handlebar arrangement of the present invention.

Pivotal connection subassembly 15 is mounted to front mounting plate 19 by a bolt 21 (FIG. 2) which is passed through one of the holes 20 and then is threaded into a front end of an adjustment yoke 23 of the pivotal connection subassembly 15. The rear end of adjustment yoke 23 is secured to the rear mounting plates 17a, 17b by passing a mounting bolt 22 through a leg 23a of yoke 23, through plate 17a, and after passing through opposite mounting plate 17b and opposite leg 23b of the adjustment yoke 23, a nut or other threaded fastener is applied onto the end of mounting bolt 22 to secure it in place. Advantageously, legs 23a, 23b are attached on the outer face of a U-shaped yoke member 23c, so that the adjustment yoke 23 can be firmly held against relative movement with respect to the rear mounting plate 17a, 17b by the ends of yoke member 23c abutting against the facing edges of these plates while the legs 23a, 23b can be brought into firm contact with the outwardly directed faces of mounting plates 17a, 17b (FIG. 5).

Mounting bolt 22 also serves as an axle bearing of the pivot means 11 by being passed through a mounting stem axle bearing housing 24 (with clearance) as it is passed from mounting plate 17a to mounting plate 17b. Mounting stem axle bearing housing 24 corresponds in outer diameter to a conventional bicycle handlebar, so that, after removal of a preexisting standard handlebar from the mounting stem 13 of a bicycle to be modified, mounting stem axle bearing housing 24 can be fixedly clamped in place within the mounting stem in the same manner as the preexisting handlebar was. In this manner, the handlebar assembly 3 is able to pivot relative to the handlebar mounting stem 13 by rotation of the mounting bolt/axle bearing 22 within axial passageway 24a of bearing housing 24, at a height that can be adjustably set by selecting which of the upper, lower, or intermediate holes 18 receive bolt 22.

To control the extent of the pivotal to-and-fro movement of the handlebar assembly 3, a position/limit stop plate 26 is welded to the end of mounting stem axle bearing housing 24 proximate mounting plate 17b, and a limit stop bolt 28 is fastened within one of the holes 18 that is adjacent the hole 18 through which mounting bolt/axle bearing 22 passes. In the case where mounting bolt/axle bearing 22 is in the uppermost hole 18 (as shown in the drawings), bolt 28 is mounted in the adjacent hole 18 therebelow with the opposite being true if the lowermost handlebar length setting hole 18 receives mounting bolt/axle bearing 22.

Figure 3:
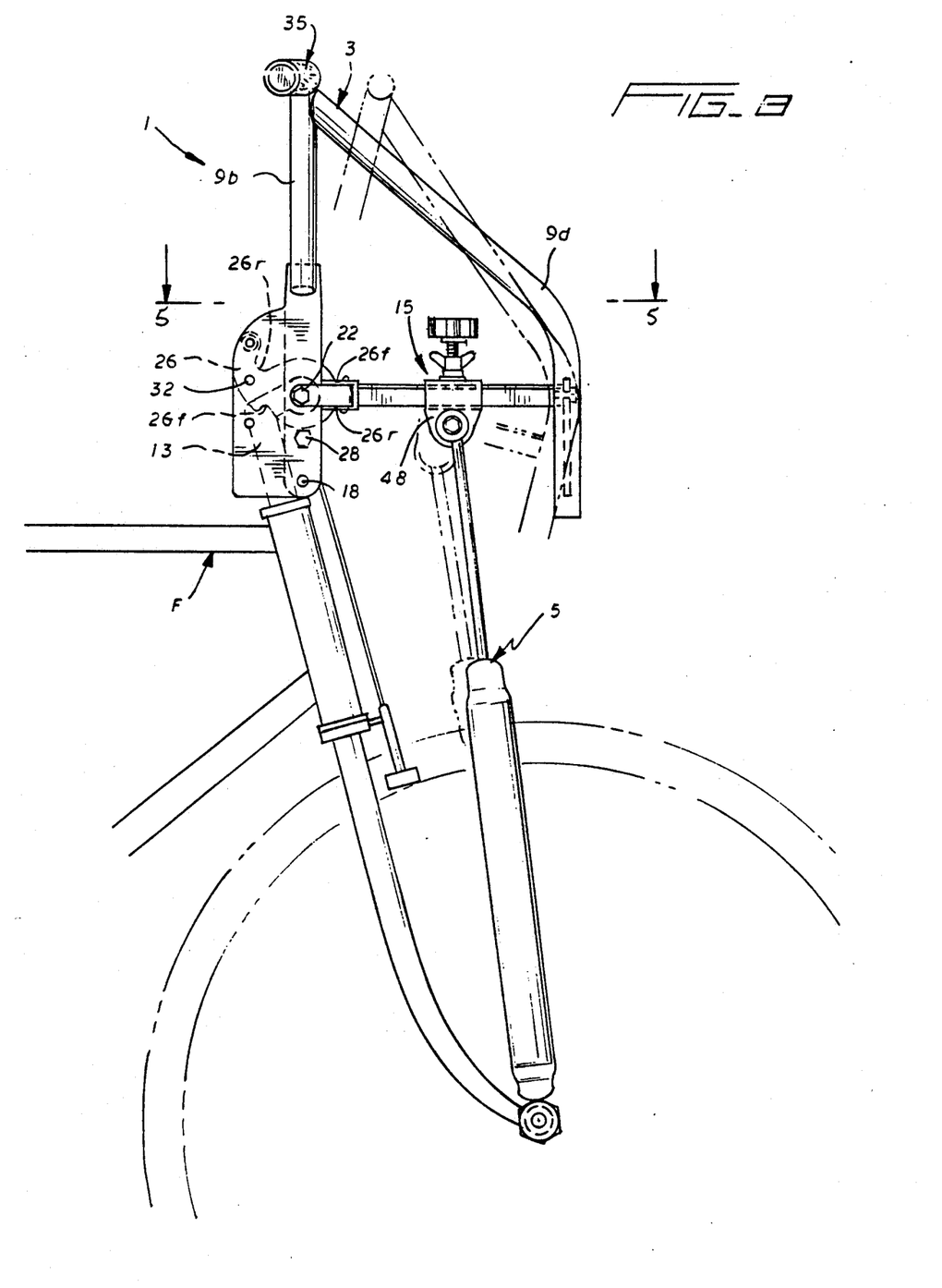
FIG. 3 is a side elevational view of the front portion of the bicycle of FIG. 1 illustrating a displaced position of the handlebar arrangement in phantom outline.
Figure 4:
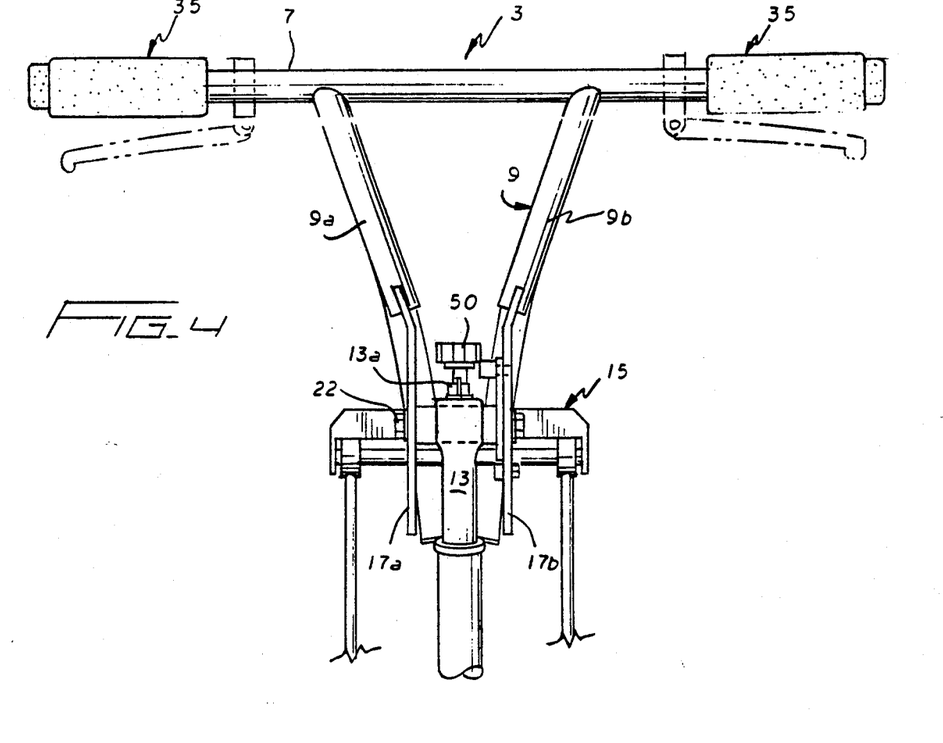
FIG. 4 is a rear elevational view of the bicycle of FIG. 1.

Depending upon whether limit stop bolt 28 is above or below position/limit stop plate 26, it will engage a respective one of upper and lower motion limiting notches 26f, 26r during forward movement (clockwise movement in the direction from the solid line toward the phantom line positions of FIG. 3) and will engage a respective one upper and lower rearward motion limiting notches 26r, 26f the handlebars are caused to oscillate back toward the rider (counterclockwise from the position illustrated in FIG. 3). In each case, the associated forward and rearward motion limiting stops 26f, 26r are disposed 120° of arc relative to each other to define the magnitude of the range of movement of the handlebars. However, to ensure that the location of the forward and rearward ends of the oscillating movement of the handlebar assembly will occur at a safe location (in terms of how far forward and aft the handlebars will pivot) for a wide variety of different types of bicycles, such can be set by rotationally adjusting the orientation of the mounting stem axle bearing housing 24 within the mounting stem 13 before tightly securing the front stem bolt 13a (FIG. 4). Being able to adjust the fixed arc of movement is important to ensure that the pivoting handlebars and the resistance means 5 do not hit the headset tube or front brakes in the forward direction of oscillation and to prevent the handlebars from rotating too far rearward, which could interfere with steering and/or the stability of the rider on the bicycle.

Still further, in order to enable a bicycle equipped with the present invention to be ridden, with the handlebar assembly immobilized, in the manner of a conventional bicycle, a finger-like extension 26s is provided with either a position stop screw 30 (FIG. 5) or a quick action, spring biased detent type position stop 30' (FIG. 6) which can be selectively brought into secure engagement with a respective one of a plurality of position stop holes 32. Position stop holes 32 are formed in plate 17b at positions that are coordinated relative to setting holes 18 to ensure that a respective position stop hole 32 can be engaged at each of the height levels set by the handlebar length setting holes 18.

Figure 6:
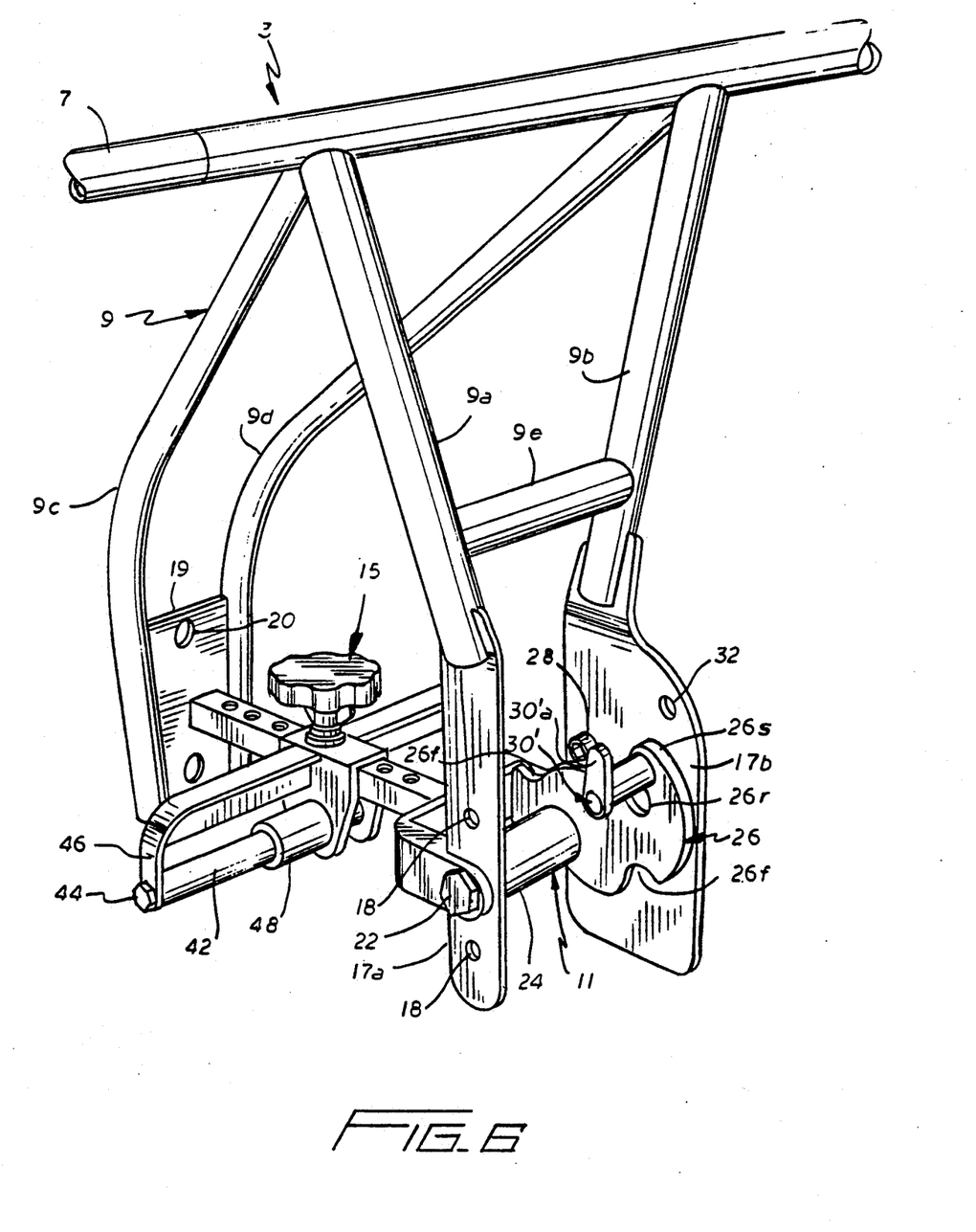
FIG. 6 is a perspective view of the handlebar assembly of the handle bar arrangement.

In the case of the quick action position stop 30', in the illustrated position of FIG. 6, the end of a pin member is held within a hole 32 under spring action but can be released quickly simply by axially pulling out on the pin via the tab-like extension 30'a and then rotating the tab-like member 30'a into a position wherein the pin is no longer able to be shifted axially under the influence of the internal spring. For reengagement, extension 30'a is rotated back to its release position, thereby enabling the pin to snap back into the hole 32 when the handlebar is brought to its upright position.

Figure 2:
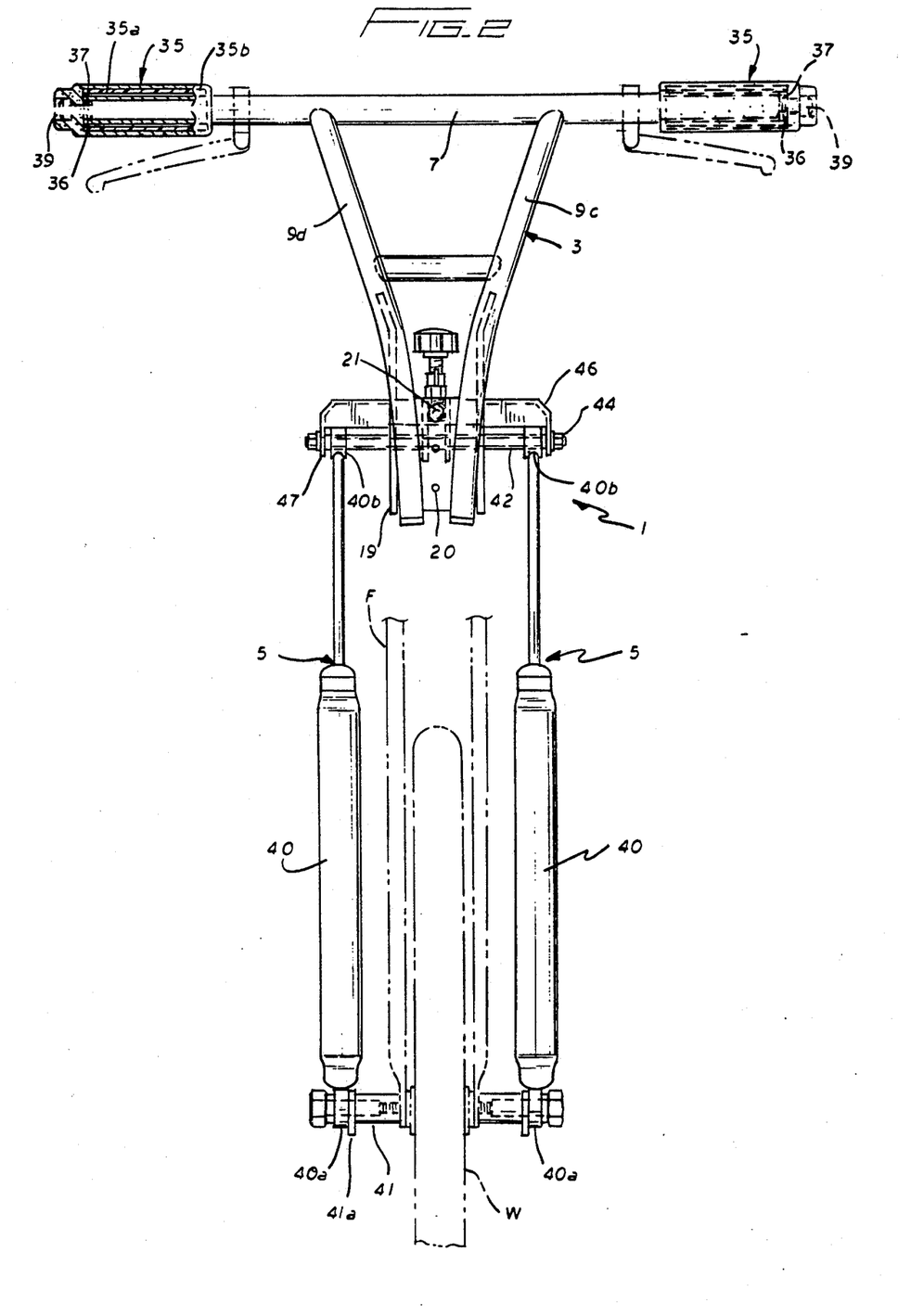
FIG. 2 is a front elevational view of the bicycle handlebar arrangement of FIG. 1 with the front wheel shown in phantom.

As can be seen in the drawings, handlebar 7 is provided with a pair of hand grips 35. While these hand grips may be of any conventional design, preferably, they are rotatable handle grips in order to prevent chaffing of the hands during rowing of the handlebars. In particular, end plugs 36 are secured in place closing open ends of the tubular handlebar 7, these end plugs being provided with a central threaded hole for receiving a shoulder bolt 37 used to retain the handgrips upon the handlebars (FIG. 2). The handgrips, themselves, are formed of molded plastic inner body 35a that has a foam rubber covering 35b. The foam rubber covering 35b enables the rider to firmly grasp the handgrips 35 and the molded plastic inner body facilitating a smooth sliding of the handgrips 35 upon the handlebar 7. The ends of the handgrips 35 are provided with a counter bore opening 39 which enables the shaft of the shoulder bolt 37 to be passed through the handgrip 35 into threaded engagement with the threaded hole in the handlebar end plug 36, while the head of the shoulder bolt 37 remains recessed within the enlarged outer end of the counter bore. In this way, the handgrip 35 is prevented from sliding axially off the ends of the handlebar 7, despite the loose sliding fit of the plastic inner body 35a over the end portions of the handlebar 7.

In order to offer resistance to the forward-and-back oscillation of the handlebar assembly 3 (as is necessary to obtaining of an effective workout), resistance means 5, advantageously, can be in the form of a pair of telescoping, shock absorber-type struts, a top end of which is pivotally connected to pivotal connection subassembly 15 and the lower end of which is connected to the axle of front wheel W. Shock absorber struts 40 can be of any commercially available design wherein two-way resistance to movement is achieved by a hydraulic, pneumatic, spring or hybrid operating mechanism, so that the operating mechanism of the shock absorber struts 40, per se, forms no part of this invention.

In fact, while adjustment of the effective resistance to movement offered by the shock absorber struts 40 is achieved through the adjustment mechanisms described below, it should be appreciated that, shock absorber struts are known which are, themselves, adjustable to offer varying degrees of load resistance. Thus, such adjustable shock absorber struts, if utilized, offer an alternative or supplemental means for adjusting the resistance to movement that the rider and back about pivot means 11.

Shock absorber struts 40 are provided with lower eye rings 40a for attachment to the front axle of the bicycle. In order to prevent bending or overstressing of the front axle, as well as to enable the exercising bicycle handlebar arrangement 1 to operate on bicycles having frames and front forks of various kinds, sizes and configurations, front wheel axle extenders 41 are provided. Axle extenders 41 comprise an internally threaded steel extender body over which a nylon bushing is applied. The axle extenders are threaded onto the ends of the axle of front wheel W, and the eye ring 40a is pivotally mounted upon the outer end of extender 41 in a manner which permits sideways shifting of each shock absorber strut relative to the wheel W between nylon collar 41a and the wheel axle nut (which, having been removed for attachment of the axle extender, can be threaded onto the free end of the axle extender to retain the eye ring 40a thereon).

Axle extenders 41 not only ensure that the shock absorber struts 40 are mounted laterally outwardly of the front fork a sufficient distance to ensure that the front fork and hand brakes are not engaged by the strut during its oscillating movement, but the sideways freedom of movement afforded to the struts serves to reduce stressing of the front wheel axle. In this connection, it is noted that the upper end of struts 40 are also provided with eye rings, and these eye rings 40b are also pivotally connected in a manner that enables them to shift in a sideways direction.

For forming the pivotal and slidable connection between eye rings 40b and the pivotal connection subassembly 15, a nylon bushing 42 is provided as a sheath upon an axle bolt 44 which, in turn, is supported under an axle housing 46 by inner and outer bearing support flanges 47, 48, respectively. The depending bearing support flanges 48 straddle an adjustment bar portion 23d of adjustment yoke 23. Adjustment bar portion 23d is provided with a plurality of threaded openings 23f along its length, into which the threaded shaft of a setting knob 50 is engaged to lock the axle housing 46 to the setting bar portion 23d of adjustment yoke 23.

As can be appreciated, by shifting the position at which the axle housing 46 is secured along the length of adjustment yoke 23, the degree of effort that will be required to pivotally displace the handlebar assembly 3 can be adjusted to provide various levels of workout from light to heavy. In this regard, it is noted that increasing and decreasing of the level of effort required to swing the handlebar assembly 3 is not limited solely to the number of resistance setting holes 23f provided in the adjustment yoke 23 since it is possible to further affect the amount of effort required by increasing and decreasing the effective length of the lever arm acting upon the resistance means 5 through raising and lowering of the handlebar assembly. That is, selection of a lower hole 18 of the mounting plates 17a, 17b, and 20 of front mounting plate 19, will decrease the effort required relative to the mounting position shown in the drawings.

As can be seen most easily with reference to FIG. 4, the illustrated embodiment of handlebar assembly 3 has a handlebar 7 that is sufficiently long to accommodate the brake levers (shown in phantom outline) of a bicycle hand braking system. Furthermore, it is not considered to be advisable to mount gear shift levers on the handlebar assembly 3, in addition to the brake levers, due to the number of cables that will have to be able to swing back and forth with the assembly as well as the difficulty of operating the gear shift levers if they are on the pivoting handlebar assembly 3. Accordingly, the right and left mounting plates 17a, 17b are at least three inches apart, thereby enabling a gear shift lever or levers to be installed on the handlebar mounting stem 13 without interfering with the pivoting of the handlebars, yet insuring easy access to the gear shifter for gear changing. In this way, the gear change cables can run from the shifter to frame F without interference. Alternatively, the gear shifting mechanism can be mounted upon the frame F.

Figure 7:
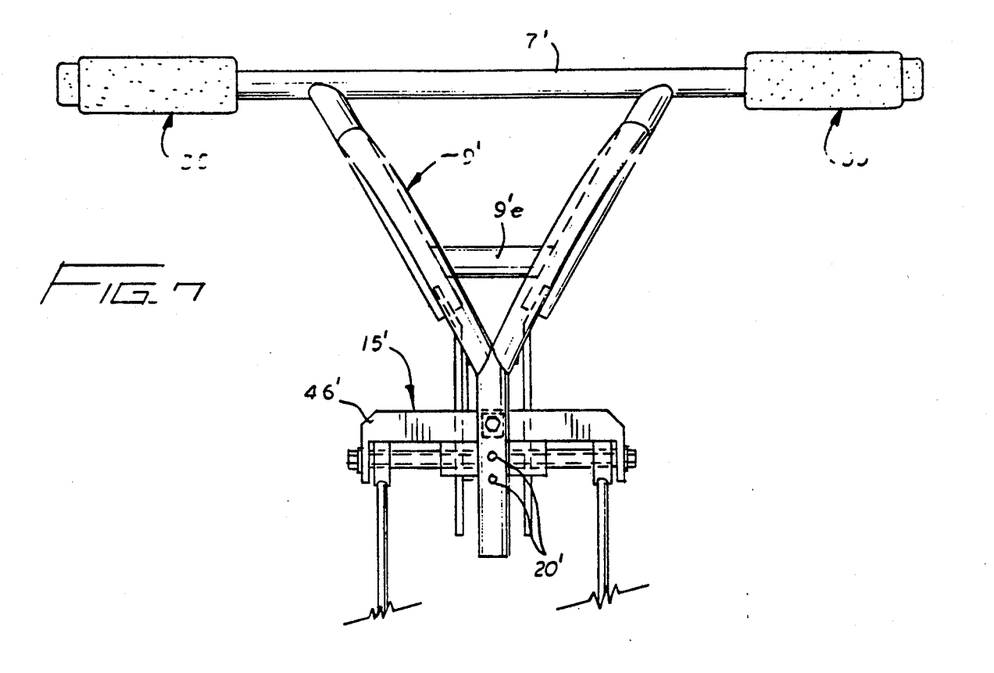
FIGS. 7 and 8 are views similar to FIGS. 2 and 4, but of a modified embodiment for use with bicycles that are not equipped with hand brakes or gear shifters.
Figure 8:
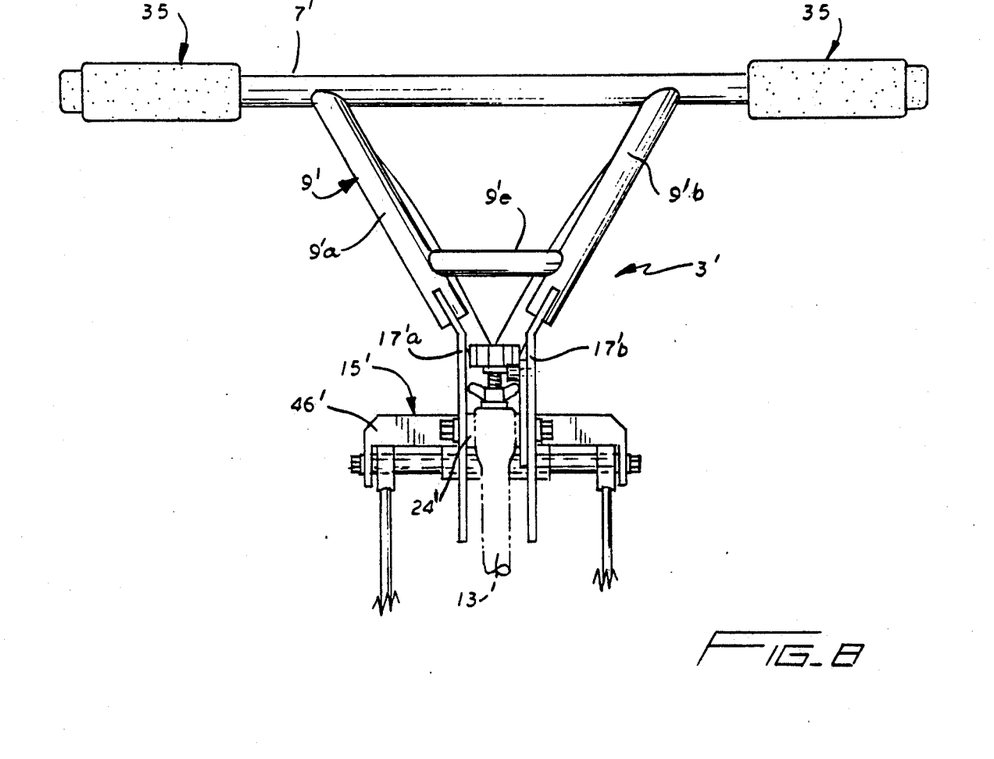

On the other hand, for use on bicycles that are not equipped with hand brakes or gear shifters, the more compact handlebar assembly 3' of FIGS. 7 and 8 can be utilized. Handlebar assembly 3' differs from that described above only in the following respects. Firstly, handlebar 7' is shorter in length than handlebar 7. Furthermore, since neither brake levers nor gear shifters need to be accommodated, and since clearance does not have to be afforded relative to wheel rim brakes, the frame-like housing 9' and the axle housing 46' of pivotal connection subassembly 15' need not be as wide. Thus, as shown in FIG. 7, front mounting plate 19 can be eliminated, the front end of yoke 23 being bolted directly to a vertical base tube of a Y-shaped front tube arrangement that is secured to the rear tubes 9'a, 9'b instead of to the handlebar 7'. Still further, the rear tubes 9'a, 9'b can be more sharply angled and the mounting plates 17'a, 17'b more closely positioned with respect to each other, thereby enabling a mounting stem axle bearing housing 24' to be utilized that is of a length that is only slightly longer than the width of the handlebar mounting stem 13. No change in operation of the exercising bicycle handlebar arrangement results from any of these modifications.

It is also pointed out that, due to the displaceability of the handlebars 7, 7' in their exercising mode, the handlebars 7, 7' no longer offer sufficient resistance for use by the rider for increasing the cranking force imparted by the rider's legs and feet, and it can be potentially difficult for the rider to maintain his or her position on the seat of the bicycle. Therefore, in accordance with a further feature of the present invention, a belt assembly 50 (FIGS. 1, 9 and 10) is provided which has the capacity to restrain forward movement of the body of the rider, thereby providing some means for offering the resistance afforded by the handlebars of a conventional bicycle while, at the same time, securely and safely holding the rider so as to prevent any tendency that might otherwise exist for the rider to fall forwardly off the seat when the handlebar 7, 7' is swung forwardly.

Belt assembly 50 comprises a carrier 51 that is attachable at the rear of the bicycle and a restraining belt. The carrier is comprised of a generally horizontally oriented T-bar 55 with depending support legs 57, and restraining belt 53, which is similar to an automobile seat belt, is swingably anchored to carrier 51.

Figure 1:
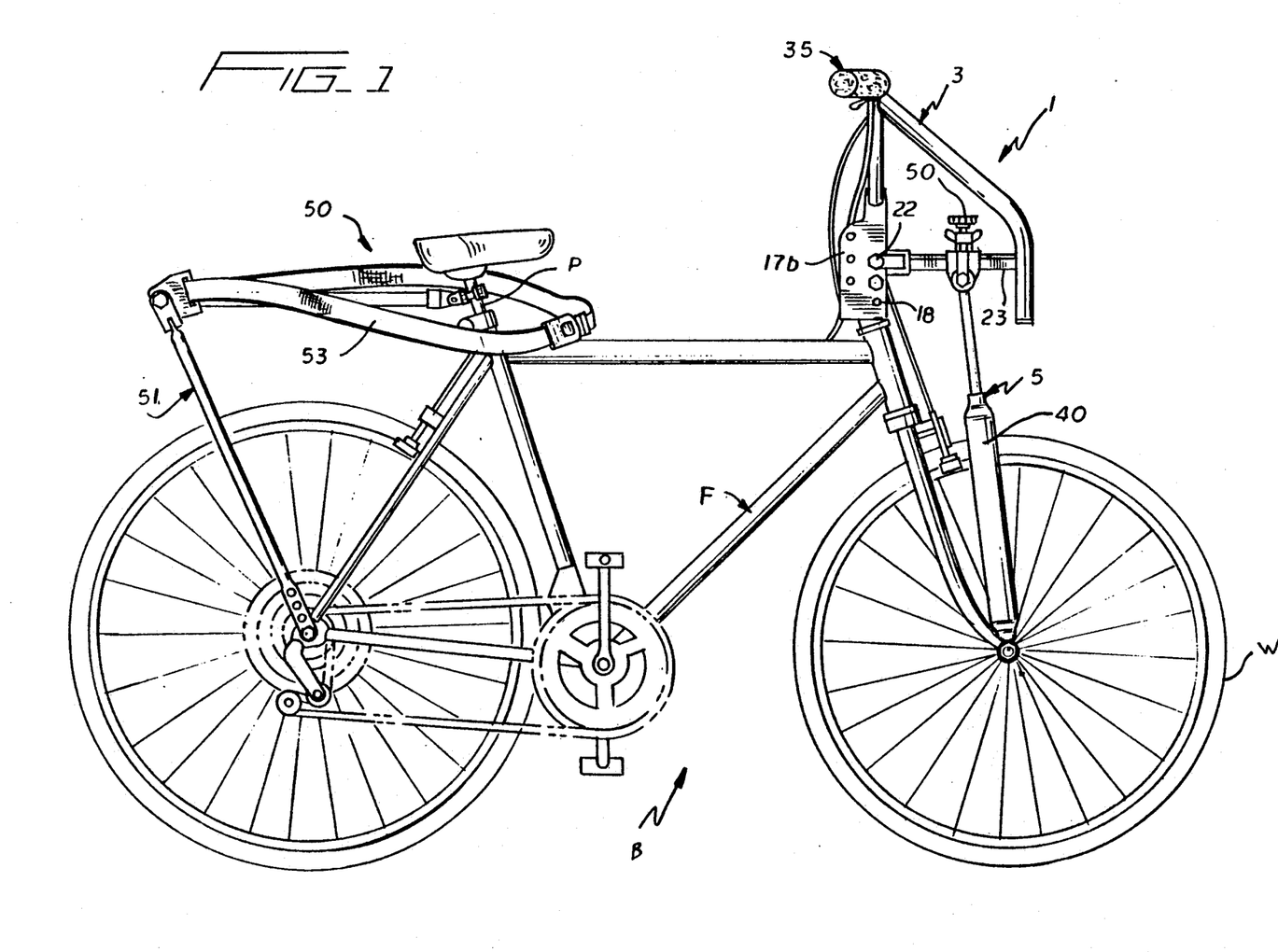
FIG. 1 is a side elevational view of a bicycle equipped with an exercising handlebar arrangement in accordance with a preferred embodiment of the present invention.

As can be seen in FIG. 1, the carrier 55 mounts to seat post P and the axle of the rear wheel of the bicycle (or the rear fork of frame F). In order to enable carrier 55 to be adjustable so that it will fit all sizes of bicycles regardless of wheel size, rear axle width, or frame size and length, the following provisions have been made. Firstly, for mounting of the T-bar 55 to the seat post P, the longitudinally extending bar 55a of T-bar 55 is provided with a clamp 60 that includes a swivel clevis fitting which enables the T-bar 55 to pivot in a vertical plane about the horizontally oriented rivet 62 which connects a socket part of the fitting 64 to the post clamping portion 66.

Furthermore, not only are the flattened lower end portions 57a provided with a plurality of axle mounting holes 58 to enable adjustment of the height of the carrier 51, but the upper ends of the legs 57 are provided with jaw slide fittings 57b which enable the legs 57 to be slid along the length of cross piece 55b of T-bar 55 to adjust the carrier to various widths. The jaw slide fittings also enable the legs to be rotated about the axis of cross piece 55b in order to adapt it to the proper angular relationship dictated by the relative positions of the points at which the legs are attached to the rear axle or frame and at which the T-bar 55 is clamped to the seat post P, thereby adjusting for various wheel and frame sizes. Once the legs are properly adjusted, their position can be fixed by clamping of the jaw slide fittings relative to the T-bar cross piece 55b via tightening of built-inset screws 57c.

Still further, in order to ensure that the restraining belt 53 is able to run in a straight line from its points of attachment at the T-bar cross piece 55b up to the point where it goes around the lower part of a rider's stomach, belt end fittings 70 are utilized that are able to swivel around the cross piece 55b in order to enable the angle of belt 53 to properly adjust itself. Belt end fittings 70 are prevented from sliding off the ends cross piece 55b by nuts 72 that are threaded onto these ends.

Figure 9:
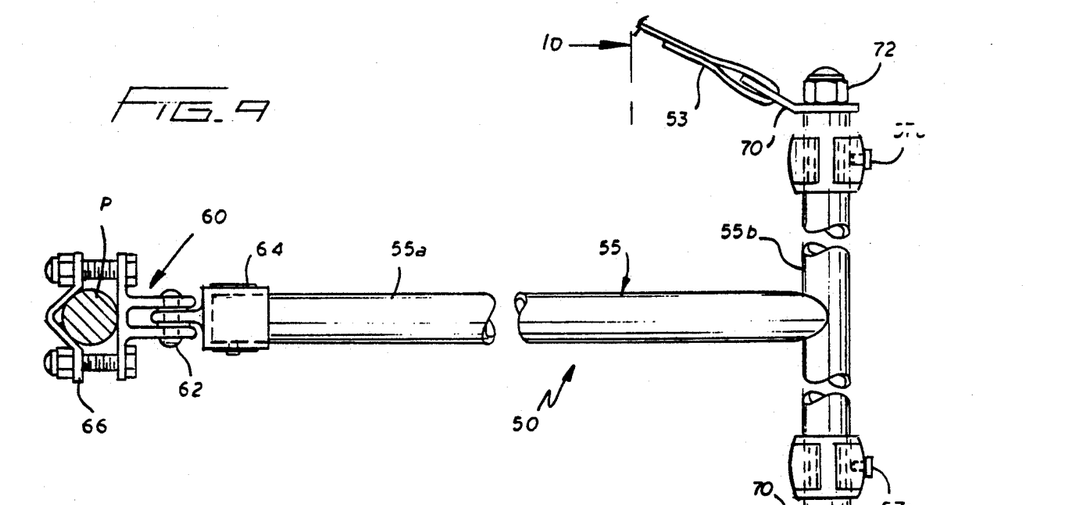
FIGS. 9 and 10 are top plan and transverse cross-sectional views, respectively, of a resistance strap assembly in accordance with the present invention, the view of FIG. 10 being taken along line 10—10 of FIG. 9.
Figure 10:
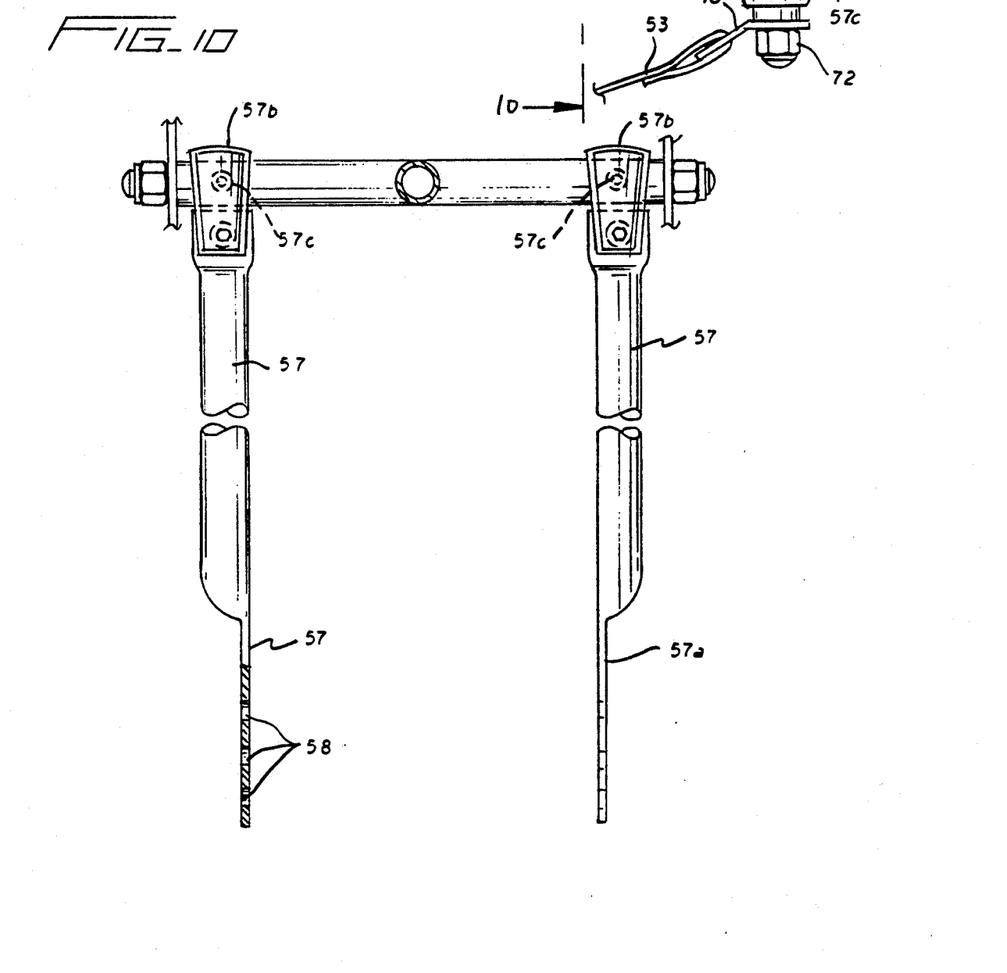

While the bicycle illustrated in FIG. 1 utilizes the carrier of FIGS. 9 and 10, it should be recognized that the use of carrier 51 is not essential to practice of the present invention. In bicycles that are already equipped with a rear carrier, fender, or other structure of sufficient strength to which restraining belt 53 can be directly fixed, carrier 1 can be dispensed with.

It should also be appreciated that even though the preferred use of the bicycle exercising handlebar arrangement of the present invention is on a bicycle used outdoors for transportation or recreational purposes, it can also be utilized on an indoor exercise bike of the type that has a conventional fixed handlebar in the same or a similar manner to that described above. Thus, the bicycle exercising handlebar arrangement of the present invention is advantageously marketable as a kit that can be installed, either by the consumer, or retailer, on any adult bicycle, whether single or multispeed, new or used, as well as other wheeled vehicles such as adult tricycles, and on indoor exercise bicycles. Furthermore, once installed, a bicycle equipped with the inventive handlebar arrangement offers a highly adjustable form of exercise for the arms, fingers, upper body and circulatory system, while retaining the ability to still use the bicycle in a conventional manner, all subject to the desires of the user.

While I have shown and described various embodiments in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the scope of the appended claims.

I claim:

1. An exercising bicycle handlebar arrangement for retrofit installation on a bicycle frame comprising:
   A) a handlebar assembly having a pair of hand grips;
   B) pivot means for pivotally connecting said handlebar assembly to a handlebar mounting stem of said bicycle frame; and
   C) resistance means for controlling the force required to displace said handlebar assembly in a forward-and-back oscillation about said pivot means, said resistance means being pivotally connected to said handlebar assembly at an upper end portion and having means for connecting a lower end portion thereof to a front wheel axle in a free rolling manner, whereby said handlebar assembly, in an installed condition on a bicycle, can be turned freely about a generally vertical axis and can be swung forward and back against a preset resistance about a generally horizontal axis during riding of the bicycle without affecting free rotation of the front wheel of the bicycle; further comprising means for selectively adjusting the force required to displace said handlebar assembly which is produced by said resistance means; wherein said means for selectively adjusting comprises said handlebar assembly being provided with an adjustment arm and means for connecting said first end portion of the resistance means to said adjustment arm at each of a plurality of locations along the length of the adjustment arm, whereby the effective length of a lever arm by which force applied to said handgrips is applied to said resistance means is controllable.

2. A handlebar arrangement according to claim 1, wherein said resistance means comprises a pair of telescopic struts.

3. A handlebar arrangement according to claim 2, wherein said means for selectively adjusting also comprises said telescopic struts being formed of piston and cylinder units having means for adjusting the force required to effect relative displacement of the piston within the cylinder.

4. A handlebar arrangement according to claim 1, further comprising means for locking said handlebars in a manner preventing said oscillation thereof about said pivot means.

5. A handlebar arrangement according to claim 1, wherein an adjustable restraining strap means is provided for preventing unrestricted forward movement of the body of the rider during forward displacement of the handlebar assembly.

6. A handlebar arrangement according to claim 5, wherein a carrier frame is provided which is mountable to the bicycle rearwardly of a seat post thereof, said restraining strap means being connected to said carrier frame.

7. A bicycle of the type having bicycle frame carrying at least one rear wheel, a pedal drive for propelling said rear wheel and a free-rolling front wheel, and a handlebar for steering of said front wheel, wherein said handlebar is formed by an exercising bicycle handlebar arrangement comprising:
   A) a handlebar mounting stem mounted to a front wheel fork of said bicycle frame;
   B) a handlebar assembly having a pair of handgrips;
   C) pivot means for pivotally connecting said handlebar assembly to said mounting stem in a manner permitting a forward-and-back oscillation of the handlebar assembly about the pivot means; and
   D) resistance means for controlling the force required to displace said handlebar assembly in said forward-and-back oscillation about said pivot means, said resistance means being pivotally connected to said handlebar assembly at an upper end portion and being connected to a front wheel axle in a free rolling manner at a lower end portion, whereby said handlebar assembly can be turned freely about a generally vertical axis and can be swung forward and back against a preset resistance about a generally horizontal axis during riding of the bicycle without affecting free rotation of the front wheel of the bicycle; further comprising means for selectively adjusting the force required to displace said handlebar assembly which is produced by said resistance means; wherein said means for selectively adjusting comprises said handlebar assembly being provided with an adjustment arm and means for connecting said first end portion of the resistance means to said adjustment arm at each of a plurality of locations along the length of the adjustment arm, whereby the effective length of a lever arm by which force applied to said handgrips is applied to said resistance means is controllable.

8. A handlebar arrangement according to claim 7, wherein said resistance means comprises a pair of telescopic struts.

9. A handlebar arrangement according to claim 8, wherein said means for selectively adjusting also comprises said telescopic struts being formed of piston and cylinder units having means for adjusting the force required to effect relative displacement of the piston within the cylinder.

10. A handlebar arrangement according to claim 7, further comprising means for locking said handlebars in a manner preventing said oscillation thereof about said pivot means.

11. A handlebar arrangement according to claim 7, wherein an adjustable restraining strap means is provided for preventing unrestricted forward movement of the body of the rider during forward displacement of the handlebar assembly.

12. A handlebar arrangement according to claim 11, wherein a carrier frame is provided which is mounted to the bicycle frame rearwardly of a seat post thereof, said restraining strap means being connected to said carrier frame.

13. A handle bar arrangement according to claim 1, wherein said means for connecting comprises an attachment means for connecting to each of opposite sides of the front wheel axle.

14. A handlebar arrangement according to claim 7, wherein the connection between the resistance means and the front wheel axle comprises an attachment means at each of opposite sides of the front wheel axle.

* * * * *